(12) United States Patent
Jambunathan et al.

(10) Patent No.: US 7,739,197 B2
(45) Date of Patent: Jun. 15, 2010

(54) GUEST LIMITED AUTHORIZATION FOR ELECTRONIC FINANCIAL TRANSACTION CARDS

(75) Inventors: Sivakumar Jambunathan, Round Rock, TX (US); Indran Naick, Cedar Park, TX (US); Cheranellore Vasudevan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 11/538,991

(22) Filed: Oct. 5, 2006

(65) Prior Publication Data

US 2008/0086424 A1 Apr. 10, 2008

(51) Int. Cl.
*G06Q 20/00* (2006.01)
(52) U.S. Cl. .............................. 705/65; 705/64; 705/72; 705/75; 705/76; 705/44; 235/380; 235/383
(58) Field of Classification Search .................... 705/14, 705/38, 65; 235/380
See application file for complete search history.

(56) References Cited

U.S. PATENT DOCUMENTS

| | | | | |
|---|---|---|---|---|
| 5,621,797 A | * | 4/1997 | Rosen | 705/76 |
| 5,930,767 A | * | 7/1999 | Reber et al. | 705/26 |
| 5,953,710 A | * | 9/1999 | Fleming | 705/38 |
| 6,052,675 A | * | 4/2000 | Checchio | 705/44 |
| 6,116,505 A | * | 9/2000 | Withrow | 235/381 |
| 6,173,269 B1 | * | 1/2001 | Solokl et al. | 705/35 |
| 6,226,624 B1 | | 5/2001 | Watson et al. | |
| 6,766,301 B1 | * | 7/2004 | Daniel et al. | 705/14 |
| 6,796,497 B2 | * | 9/2004 | Benkert et al. | 235/380 |
| 6,950,810 B2 | | 9/2005 | Lapsley et al. | |
| 7,006,993 B1 | | 2/2006 | Cheong et al. | |
| 7,172,112 B2 | * | 2/2007 | Bonalle et al. | 235/379 |
| 7,401,032 B1 | * | 7/2008 | Golden et al. | 705/14 |
| 7,461,028 B2 | * | 12/2008 | Wronski, Jr. | 705/44 |
| 2002/0034301 A1 | * | 3/2002 | Andersson | 380/270 |
| 2003/0055727 A1 | * | 3/2003 | Walker et al. | 705/14 |
| 2004/0139008 A1 | * | 7/2004 | Mascavage, III | 705/40 |
| 2005/0021450 A1 | * | 1/2005 | Nakfoor | 705/37 |
| 2006/0123465 A1 | * | 6/2006 | Ziegler | 726/2 |
| 2007/0094512 A1 | * | 4/2007 | Nomiya | 713/186 |
| 2007/0276765 A1 | * | 11/2007 | Hazel et al. | 705/71 |
| 2009/0177582 A1 | * | 7/2009 | Cucinotta | 705/44 |

* cited by examiner

*Primary Examiner*—Pierre E Elisca
*Assistant Examiner*—Mamon Obeid
(74) *Attorney, Agent, or Firm*—John Pivnichny; Schubert Osterrieder & Nickelson PLLC

(57) ABSTRACT

Generally speaking, methods and media for authorizing a guest to use an electronic financial transaction card, such as a credit card or debit card, are disclosed. Embodiments may include receiving information about a desired guest transaction (which may be limited in size, timeframe, nature, etc.) from a customer associated with an EFT card, generating a guest PIN number and artifact information for the guest transaction, and transmitting them to the customer. Embodiments may also include receiving from a financial terminal a PIN number and an indication of a supplied artifact associated with a proposed transaction utilizing the EFT card. Embodiments may include determining whether the proposed transaction should be authorized based on the received PIN number and the supplied artifact and, in response to determining that the proposed transaction should be authorized, transmitting approval of the proposed transaction to the financial terminal.

11 Claims, 8 Drawing Sheets

GUEST LIMITED AUTHORIZATION FOR ELECTRONIC FINANCIAL TRANSACTION CARDS

FIELD OF INVENTION

The present invention is in the field of electronic authorization of financial transactions, in particular, to methods and media for authorizing a guest to use an electronic financial transaction card.

BACKGROUND

The use of electronic financial transaction (EFT) cards such as credit cards and debit cards continues to play a vital and significant role in today's economy. Customers may use EFT cards to purchase goods and services from a vendor, to withdraw cash from an automated teller machine (ATM), or perform other financial tasks. For many types of EFT cards (such as cash withdrawal cards), a customer must enter a personal identification number (PIN) to successfully complete the transaction, while other transactions may require signatures to be accepted (e.g., higher value credit card purchases). As EFT cards have become more and more ubiquitous, so has the infrastructure for supporting the use of EFT cards in commerce, resulting in increased use of credit card authorization machines and ATM machines. A customer may now, for example, use a conveniently-located ATM machine to withdraw cash from an account or, in another example, purchase their groceries either with a credit card or a debit card.

For an automatic transaction (i.e., without human merchant involvement), the ATM machine may typically read the customer's ATM card, request authorization for the customer's withdrawal from the customer's bank, and dispense the cash once authorization has been received from the bank. For a merchant transaction, the merchant may typically swipe the customer's credit card in a credit card authorization machine, which may then transmit a request to purchase the good or service via the requested amount of credit. Once approval of the credit is received from the credit card provider, the merchant may then charge the credit card for the desired amount and complete the transaction. The functionality and prevalence of EFT cards are likely to continue to increase and more people acquire the cards, more people use them for different types of transactions, and as competition between EFT card providers intensifies.

Often, however, a customer may desire for someone else to perform a financial distraction on their behalf. A person that cannot leave their house, for example, may want someone to run an errand for them that requires use of an EFT card, such as going to withdraw cash or purchase groceries. In another example, a parent may wish for their child to make a transaction that the parent has authorized, such as purchasing gasoline or books for school. To have someone else perform these tasks with their EFT card, the customer must provide the EFT card and possibly the PIN number (depending on the nature of the transaction) to the other person so that they can complete the task. By providing the EFT card and other information, the customer runs the risk that the other person will use the EFT card for inappropriate purposes, such as if they purchase additional items for themselves or steal cash from the customer's account. One solution to this problem is for some customers to acquire a limited-purpose EFT card, such as a credit card associated with a gasoline company, in the hopes that this will limit misappropriation of funds. Such a solution, however, does not provide a satisfactory solution in many cases and is also itself subject to abuse, such as when children exchange purchases for others with a gasoline card for cash.

SUMMARY OF THE INVENTION

The problems identified above are in large part addressed by systems, methods and media for authorizing a guest to use an electronic financial transaction card. Embodiments of the method may include receiving information about a desired guest transaction from a customer associated with an EFT card, generating a guest PIN number and artifact information for the guest transaction, and transmitting the guest PIN number and the artifact information to the customer. Embodiments of the method may also include receiving from a financial terminal a PIN number and an indication of a supplied artifact associated with a proposed transaction utilizing the EFT card. Embodiments of the method may also include determining whether the proposed transaction should be authorized based on the received PIN number and the indication of the supplied artifact and, in response to determining that the proposed transaction should be authorized, transmitting approval of the proposed transaction to the financial terminal. Further embodiments of the method may include where the received information about the desired guest transaction may include a limit to the size of the guest transaction, a predefined timeframe for the guest transaction, or a limit to a subject matter of the guest transaction.

BRIEF DESCRIPTION OF THE DRAWINGS

Aspects of certain embodiments of the invention will become apparent upon reading the following detailed description and upon reference to the accompanying drawings in which, like references may indicate similar elements.

DETAILED DESCRIPTION OF EMBODIMENTS

Figure 1:
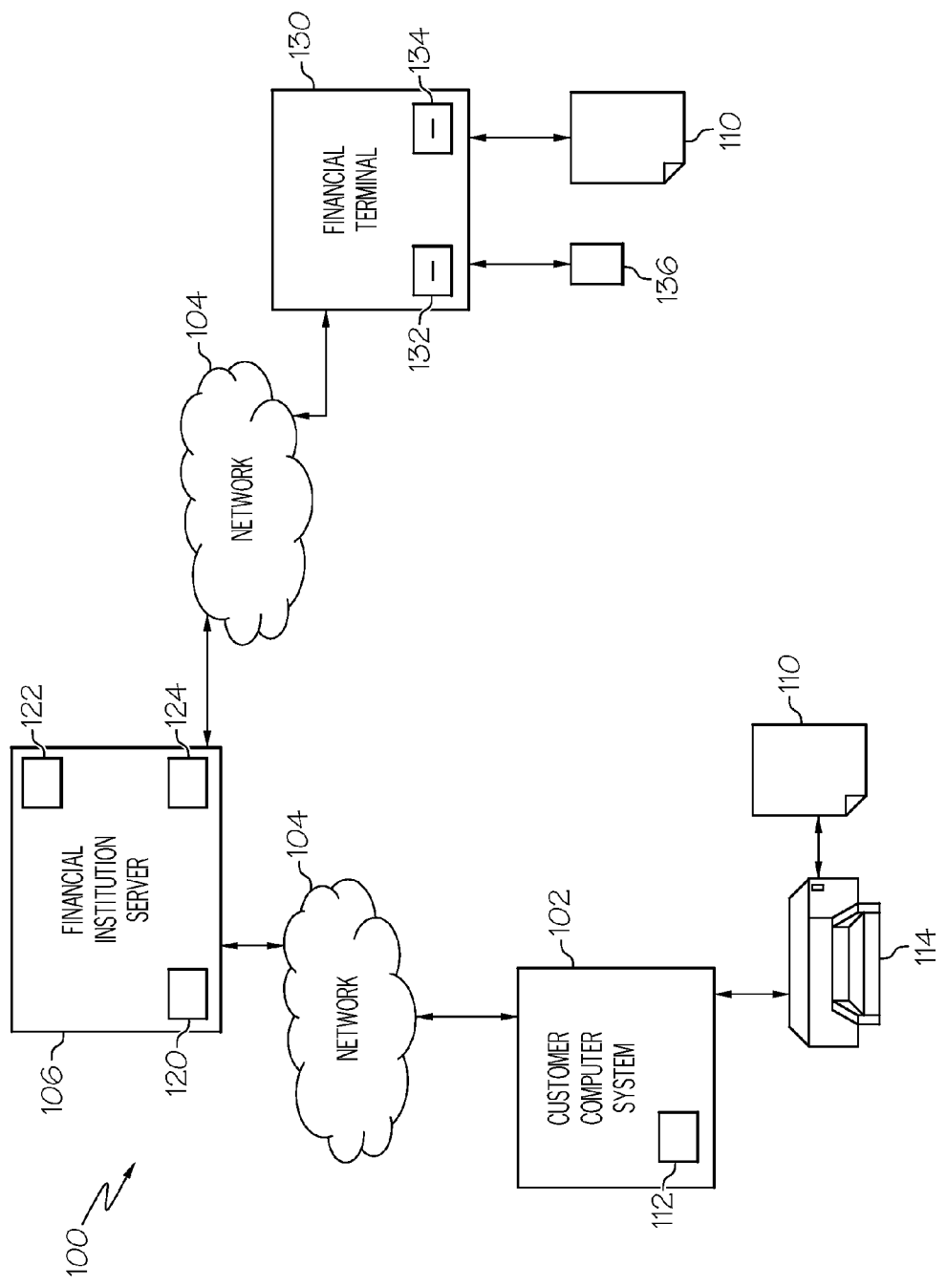
FIG. 1 depicts an environment for a guest limited authorization system with a customer computer system, a financial institution server, and a financial terminal according to some embodiments.

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, methods and media for authorizing a guest to use an electronic financial transaction card, such as a credit card or debit card, are disclosed. Embodiments may include receiving information about a desired guest transaction (which may be limited in size, timeframe, nature, etc.) from a customer associated with an electronic financial transaction (EFT) card, generating a guest personal identification number (PIN) number and artifact information for the guest transaction, and transmitting them to the customer. Embodiments may also include receiving from a financial terminal a PIN number and an indication of a supplied artifact associated with a proposed transaction utilizing the EFT card. Embodiments may include determining whether the proposed transaction should be authorized based on the received PIN number and the supplied artifact and, in response to determining that the proposed transaction should be authorized, transmitting approval of the proposed transaction to the financial terminal.

The system and methodology of the disclosed embodiments provides a mechanism for a customer to define a limited guest transaction for their EFT card that may greatly reduce the risk of inappropriate use of their EFT card. The customer may access their financial institution via a computer system and may define one or more limited transactions using their card. They may then receive a PIN number and artifact information with which the customer may print an artifact, which they may then pass to a third party, or guest, along with the EFT card. The guest may then use the EFT card for the limited purpose by entering the PIN number and providing the artifact at the financial terminal. The financial terminal, based on communication with the financial institution, will approve the transaction if appropriate and deny the transaction if it goes beyond specified limits. A customer may specify limits such as type of good or service, value of transaction, a timeframe for performing the task, or other limitation. Using the disclosed system, a customer may therefore send out an assistant to buy less than $100 of groceries with the customer's credit card or may allow a child to withdraw $40 in cash (but no more) from an ATM machine, to describe just two examples.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While specific embodiments will be described below with reference to particular configurations of hardware and/or software, those of skill in the art will realize that embodiments of the present invention may advantageously be implemented with other substantially equivalent hardware and/or software systems. The invention can take the form of an entirely hardware embodiment, an entirely software embodiment or an embodiment containing both hardware and software elements. In a preferred embodiment, the invention is implemented in software, which includes but it not limited to firmware, resident software, microcode, etc.

Aspects of the invention described herein may be stored or distributed on computer-readable medium as well as distributed electronically over the Internet or over other networks, including wireless networks. Data structures and transmission of data (including wireless transmission) particular to aspects of the invention are also encompassed within the scope of the invention. Furthermore, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Each software program described herein may be operated on any type of data processing system, such as a personal computer, server, etc. A data processing system suitable for storing and/or executing program code may include at least one processor coupled directly or indirectly to memory elements through a system bus. The memory elements may include local memory employed during execution of the program code, bulk storage, and cache memories which provide temporary storage of at least some program code in order to reduce the number of times code must be retrieved from bulk storage during execution. Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices though intervening private or public networks, including wireless networks. Modems, cable modems and Ethernet cards are just a few of the currently available types of network adapters.

Turning now to the drawings, FIG. 1 depicts an environment for a guest limited authorization system with a customer computer system, a financial institution server, and a financial terminal according to some embodiments. The guest limited authorization system 100 includes one or more customer computer systems 102 in communication with a financial institution server 106 via a network 104. The financial institution server 106 may also be in communication with one or more financial terminals 130 via network 104. As will be described in more detail subsequently, the disclosed guest limited authorization system 100 may provide for the ability for a customer to specify a limited "guest" transaction using their electronic financial transaction (EFT) card so that they may allow others to perform financial transactions on their behalf at a financial terminal 130 without the major risk of misappropriation resulting from previous methods.

A customer may utilize a customer computer system 102 to define a guest transaction with a financial institution and to receive the relevant information necessary to produce one or more artifacts according to the disclosed system. Customer computer systems 102 may each include one or more personal computers (PCs), workstations, servers, mainframe computers, notebook or laptop computers, desktop computers, PDAs, set-top boxes, mobile phones, wireless devices, or other computer systems. In some embodiments, customer computer system 102 may be a computer system as described in relation to FIG. 2 and may be in wired or wireless communication with network 104. In some embodiments, the customer computer system 102 may include a browser 112 to facilitate interaction between the customer and the financial institution server 106. A browser 112 may be a graphical browser application that allows a user to view Internet or intranet content such as Microsoft Corporation's Internet Explorer™, Netscape Communication Corporation's Navigator™, Mozilla Foundation's Firefox, Opera Software ASA's Opera, Apple Corporation's Safari™, etc. Browsers 112, at their most basic level of operation, permit users to connect to a given network site, download informational content from that site, and display that information to the user. A customer may thus interact with the financial institution server 106 via the browser 112 and user input devices of the customer computer system 102 such as a mouse, keyboard, voice input device, etc. In some embodiments, a customer may utilize other programs to interact with the financial institution server 106, such as e-mail clients, dedicated programs from the financial institution, financial programs, or other software.

As will be described in more detail in FIG. 4, a customer or other user may utilize the customer computer system 102 to define and request a set of guest transactions via their browser 112 by logging in to the website of their bank or other financial institution. They may then receive artifact information and a guest personal identification number (PIN) from the financial institution server 106 and then use the received artifact information to print out an artifact 110 on their printer 114 in communication with their customer computer system 102. Artifact information may include any information relevant to a desired guest transaction, and may include information about desired limits to any transaction, including limits on the nature of the transaction (e.g., only groceries), the timeframe for the transaction (e.g., only useable today), the amount of the transaction (e.g., less than $100), or other limitation. The customer may then hand the printed artifact 110 (and also provide the guest PIN) to the guest, or third party, that they desire to perform the guest transaction. As will also be described in more detail, the other party may then use the guest PIN and artifact 110 to perform the desired transaction but will not be able to perform additional, unauthorized transactions.

The printer 114 may print one or more artifact 110 after the customer computer system 102 has received artifact information relevant to a desired guest transaction from the financial institution server 106. In some embodiments, printer 114 may include any type of printer that prints on paper (including laser, inkjet, thermal, or other printers) and may therefore print artifacts 110 that represent printing on paper. For example, a printer 114 may print an artifact 110 that is a piece of paper with a printer barcode that includes artifact information and is machine-readable. The barcode may include (in its machine-readable form) some or all of the artifact information for the desired guest transaction for use by the financial terminal 130, as will be described subsequently. In other examples, artifact 110 may include paper or other writing material with human-readable writings or other forms of machine-readable printing. In an alternative embodiment, the printer 114 may be a Radio Frequency Identification (RFID) printer suitable for printing RFID tags (for use as artifacts 130) in addition to barcodes. An example RFID printer is IBM's Infoprint® 6700 RFID printer to encode and print RFID labels.

The financial institution server 106, as will be described in more detail in relation to FIG. 3, may interact with either or both of customer computer systems 102 and financial terminals 130 to facilitate operation of the guest limited authorization system 100. The financial institution server 106 may be a server computer system or other computer system adapted to execute computer programs. In some embodiments, the financial institution server 106 may be one or more server computer systems such as an International Business Machine Corporation (IBM) xSeries® server, an IBM pSeries® server, an IBM eServer® server, an IBM Websphere® application server, or other computer system (such as described in relation to FIG. 2). The financial institution server 106 may be implemented over multiple servers, such as by implementing its functionality for interaction with customer computer systems 102 on one set of servers and its functionality for interacting with financial terminals 130 on other servers.

Financial institution server 106 may include an e-commerce website manager 120, a guest authorization module 122, and a financial terminal manager 124. The e-commerce website manager 120 may interact with customer computer systems 102 and may receive information about desired guest transactions from a customer associated with a particular EFT card. The e-commerce website manager 120 may also work with the guest authorization module 122 to transmit a determined guest PIN and artifact information to the customer. The guest authorization module 122 may generate artifact information and a guest PIN associated with the desired guest transaction and may transmit those to the customer (via the e-commerce website manager 120). The financial terminal manager 124 may interact with financial terminals 130 by receiving a PIN number and an indication of a supplied artifact for a proposed transaction utilizing an EFT card. The guest authorization module 122 may determine whether the proposed transaction utilizing the EFT card should be authorized and may transmit, in conjunction with the financial terminal manager 124, approval of the proposed transaction to the financial terminal 130.

The financial terminal 130 may be any type of device adapted to interact with an individual so as to perform a financial transaction for that individual. Example financial terminals 130 may include ATM machines, credit card readers, point-of-sale terminals, or other devices. The financial terminal 130 may include a card reader 132 and an artifact reader 134, which may be the same device in some embodiments. The card reader 132 may be any device adapted to read an EFT card 136. Card readers 132 may include card swipers that read a magnetic strip of an EFT card 136 upon "swipe" of the card through the card reader 132, ATM machine card readers that pull an EFT card 136 into the financial terminal 130 to read it (including by swiping it during insertion), barcode readers, or wireless card readers 132 that may wirelessly receive information from an EFT card 136 (such as Bluetooth receivers and RFID receivers). Artifact readers 134 may read an artifact 110 to extract artifact information from it, and may include any type of device to accomplish this purpose, including the devices listed for the card reader 132. In one embodiment, the EFT card 136 may be a card swiper while the artifact reader 134 is a barcode reader suitable for reading barcodes printed on paper. EFT cards may include any type of card adapted to be utilized for a financial transaction, including credit cards, debit cards, ATM cards, gift cards, or other cards.

In the guest limited authorization system 100, the components may be located at the same location, such as in the same building or computer lab, or could be remote. While the term "remote" is used with reference to the distance between the components of the guest limited authorization system 100, the term is used in the sense of indicating separation of some sort, rather than in the sense of indicating a large physical distance between the systems. For example, any of the components of the guest limited authorization system 100 may be physically adjacent or located as part of the same computer system in some network arrangements.

Network 104 may be any type of data communications channel or combination of channels, such as the Internet, an intranet, a LAN, a WAN, an Ethernet network, a wireless network, telephone network, a proprietary network, or a broadband cable network. Network 104 may serve as a communication medium between components of the guest limited authorization system 100. In one example, the Internet or other public network may be particularly useful as a network 104 between the customer computer systems 102 and the financial institution server 106. Those skilled in the art will recognize, however, that the invention described herein may be implemented utilizing any type or combination of data communications channel(s) without departure from the scope and spirit of the invention.

The systems and methodologies of the disclosed embodiments provide an efficient and effective mechanism for providing customers with the ability to authorize limited guest transactions for their EFT card. By interacting with their financial institution to define a guest transaction and generating an artifact 110, a customer may provide the artifact 110, the EFT card 136, and a guest PIN to another person so that the person may perform financial tasks for the customer without having the ability to use the EFT card 136 to perform other, unauthorized transactions. Customers may therefore have others perform financial transactions on their behalf without having to worry about a significantly increased risk of misappropriation of their account or funds.

Figure 2:
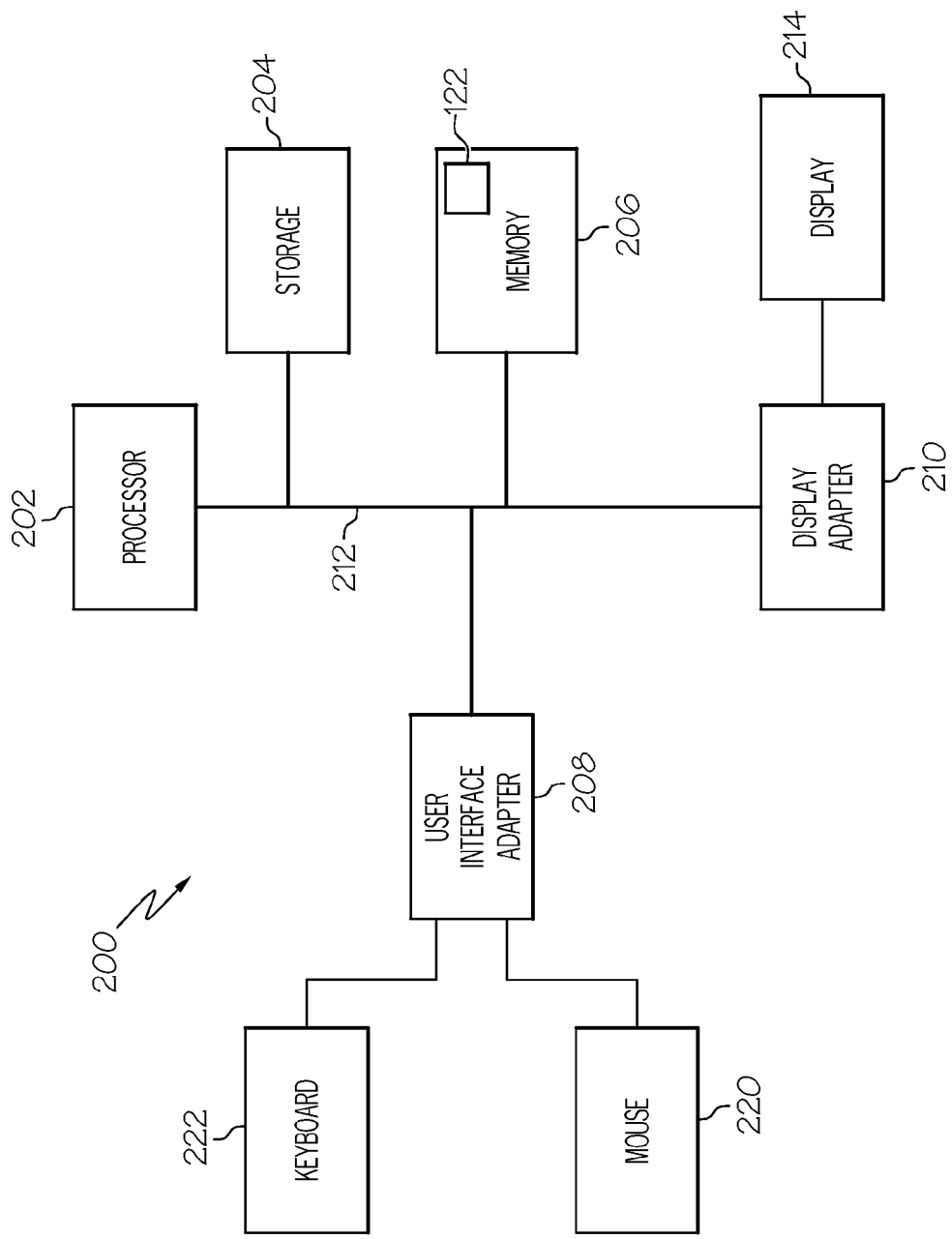
FIG. 2 depicts a block diagram of one embodiment of a computer system suitable for use as a component of the guest limited authorization system, such as a customer computer system or financial institution server.

FIG. 2 depicts a block diagram of one embodiment of a computer system 200 suitable for use as a component of the guest limited authorization system 100, such as a customer computer system 102 or financial institution server 106. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 212 or other interconnect. The bus 212 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. The processor 202 may utilize storage 204, which may be non-volatile storage such as one or more hard drives, tape drives, diskette drives, CD-ROM drive, DVD-ROM drive, or the like. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM). In the disclosed systems, for example, a processor 202 may execute instructions to perform functions of the guest authorization module 122 of the financial transaction server 106, such as generating artifact information or a guest PIN number, and may temporarily or permanently store information during its calculations or results after calculations in storage 204 or memory 206. All of part of the guest authorization module 122, for example, may be stored in memory 206 during execution of its routines.

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. A user of a customer computer system 102, for example, may utilize the keyboard 222 and mouse 220 to interact with their browser 112. The bus 212 may also connect the processor 202 to a display, such as an LCD display or CRT monitor, via the display adapter 210.

Figure 3:
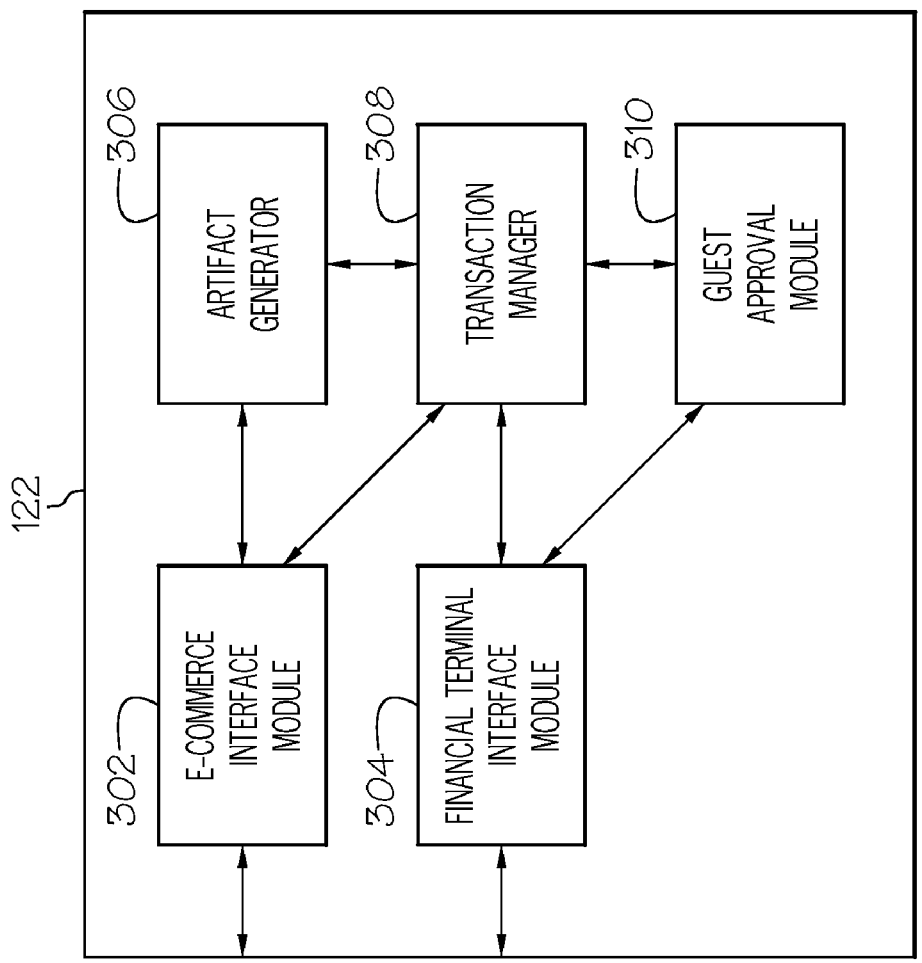
FIG. 3 depicts a conceptual illustration of software components of a guest authorization module according to some embodiments.

FIG. 3 depicts a conceptual illustration of software components of a guest authorization module 122 according to some embodiments. As described previously (and in more detail in relation to FIGS. 6-7), the guest authorization module 122 may a generate artifact information and a guest PIN associated with the desired guest transaction and may transmit those to the customer (via the e-commerce website manager 120) and may also determine whether a proposed transaction utilizing the EFT card should be authorized and may transmit, in conjunction with the financial terminal manager 124, approval of the proposed transaction to the financial terminal 130. The guest authorization module 122 may execute on a financial institution server 106 and may optionally be wholly or partially integrated within either or both of an e-commerce website manager 120 or a financial terminal manager 124.

The guest authorization module 122 may include an e-commerce interface module 302, a financial terminal module 304, an artifact generator 306, a transaction manager 308, and a guest approval module 310. The e-commerce module 302 may facilitate communications to and from and interactions with customer computer systems 102. In some embodiments, the e-commerce interface module 302 may include a website interface accessible via a browser 112. The e-commerce interface module 302 may receive information about a desired guest transaction from a customer associated with an EFT card via their customer computer system 102. The e-commerce interface module 302 may also facilitate transmittal of the guest PIN and the artifact information to the customer. The financial terminal module 304 may facilitate communications to and from and interactions with financial terminals 130. The financial terminal module 130 may receive from a financial terminal 130 a PIN number and an indication of a supplied artifact for a proposed transaction using an EFT card. The financial terminal module 304 may also facilitate transmitting approval or denial of an approved transaction to the financial terminal 130. Some or all of the functionality of the e-commerce interface module 302 and the financial terminal interface module 304 may be accomplished by the e-commerce website manager 120 or financial terminal manager 124, respectively.

The artifact generator 306 may generate artifact information for a guest transaction in response to a request from the transaction manager 308. The transaction manager 308 may receive information about a desired guest transaction and facilitate specifying the limited guest transaction, such as by managing limitations such as financial value, subject matter or nature, timeframe, etc. The transaction manager 308 may interact with the customer via the e-commerce interface module 302 and the e-commerce website manager 120 to determine the customer's preferences and to store an indication of them for later transaction approval. Once the transaction manager 308 has received a requested guest transaction, it may generate a guest PIN and instruct the artifact generator to generate artifact information, after which if may transmit the guest PIN and the artifact information to the customer.

The guest approval module 310 may receive a PIN number and an indication of a supplied artifact for a proposed transaction utilizing an EFT card from a financial terminal 130. The guest approval module 310 may then determine whether the proposed transaction utilizing the EFT card should be authorized and may transmit, in conjunction with financial terminal interface module 304 and the financial terminal manager 124, approval of the proposed transaction to the financial terminal 130. The guest approval module 310 may determine whether a proposed transaction should be authorized by any methodology, including by comparing the received PIN number and indication of the supplied artifact for the proposed transaction with the generated artifact information and the guest PIN to determine if they match.

Figure 4:
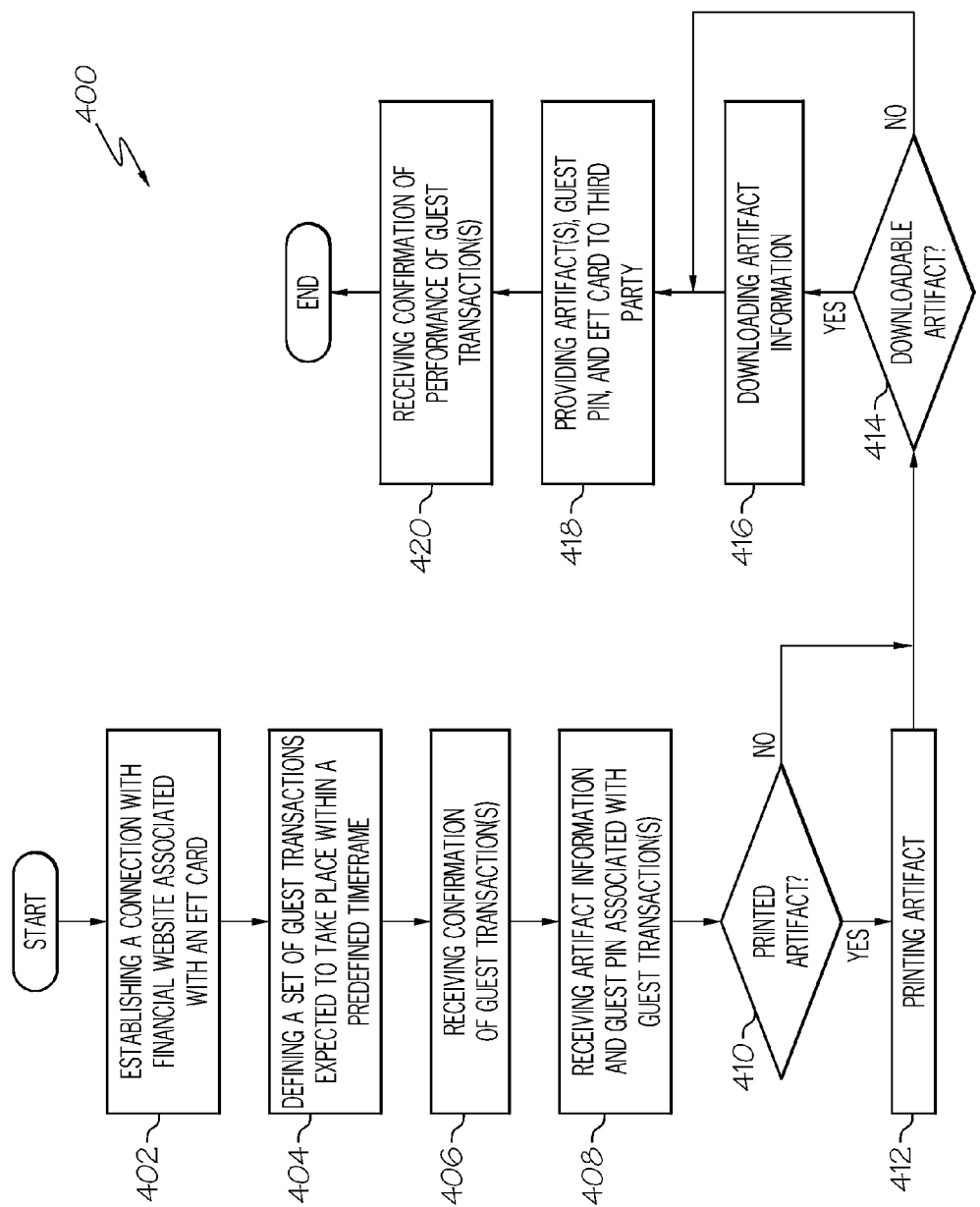
FIG. 4 depicts an example of a flow chart for defining a guest transaction and generating an artifact according to some embodiments.

FIG. 4 depicts an example of a flow chart 400 for defining a guest transaction and generating an artifact according to some embodiments. The method of flow chart 400 may be performed, in one embodiment, by a customer interacting with a browser 112 on a customer computer system 102. Flow chart 400 begins with element 402, where the user may establish a connection with a financial website associated with an EFT card 136. A user may, for example, login to a website for the bank that manages their checking account and ATM card (i.e., the bank for which they are a customer). A user id and password may be required by the financial website. Once the customer has logged in to the financial website, they may at element 404 define a set of guest transactions they wish to authorize. The customer may limit the transactions to those expected to take place within a certain timeframe. The customer may also limit the transactions via other means, including by specifying a limit on the nature of the transaction or the amount of the transaction in addition to specifying a timeframe. Limits on the nature of the transaction may include limiting purchases to a particular good or service, excluding certain goods or services, including or excluding particular establishments or types of establishments, etc.

After specifying one or more guest transactions the customer desires to authorize, the customer may receive confirmation of the guest transactions being set-up at element 406 and artifact information and a guest PIN associated with the guest transactions at element 408. Artifact information and a guest PIN may be different for each of multiple transactions in some embodiments. The customer computer system 102 may then create the artifact for use by the guest. If the artifact 110 is to be a printed artifact at decision block 410, the printer 114 may create a printed artifact 110, such as by printing a barcode on a piece of paper or by printing an RFID tag. Alternatively, if the artifact 110 is to be a downloaded artifact at decision block 414, the customer computer system 102 may download the artifact information to the artifact 110 at element 416. The customer may then at element 418 pass any artifacts 110, the guest PIN number, and their EFT card 136 to the guest so that they may then perform financial transactions on behalf of the customer. The customer may optionally receive confirmation of performance of the guest transaction at element 420, after which the method may terminate.

Figure 5:
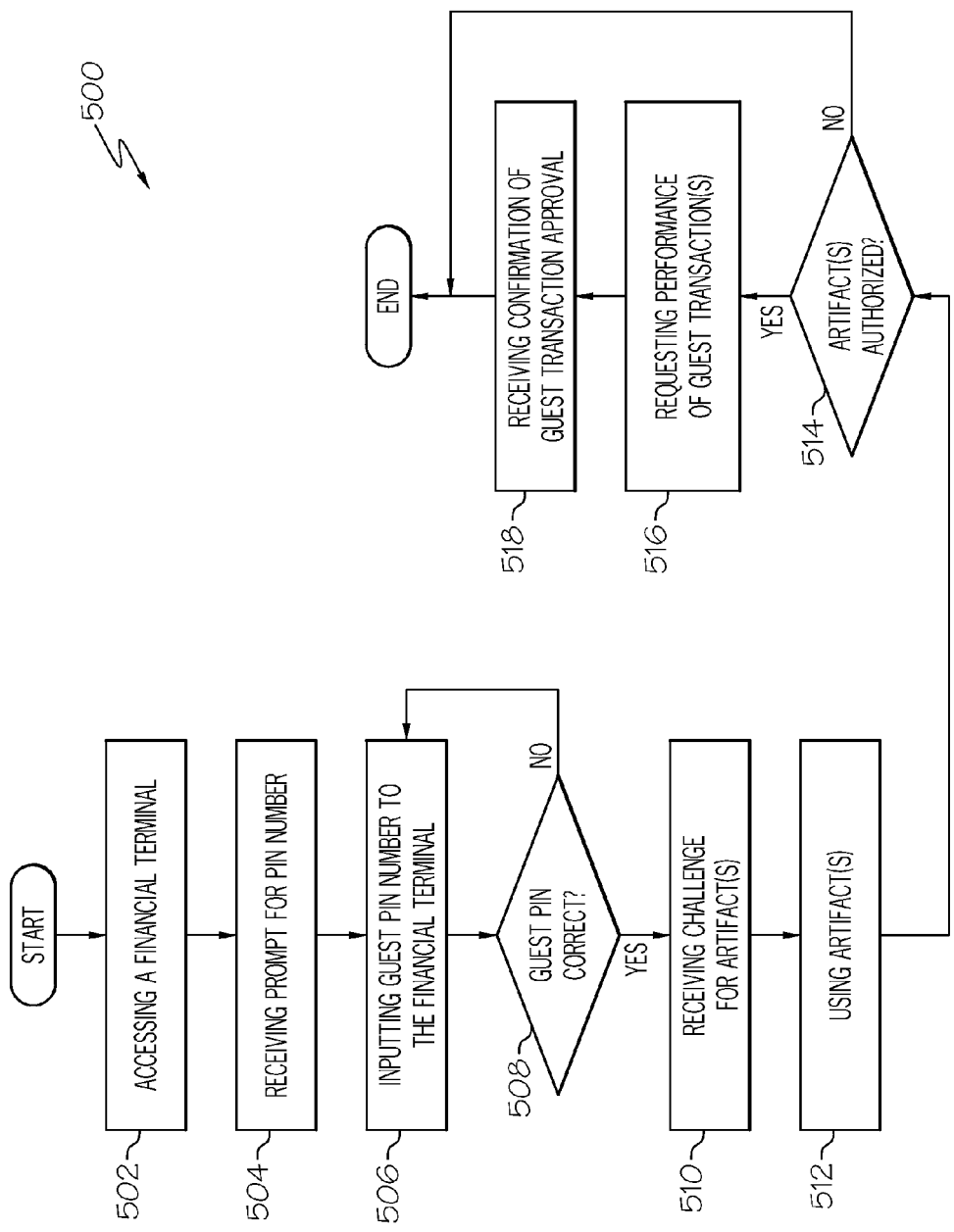
FIG. 5 depicts an example of a flow chart for performing a guest transaction at a financial terminal according to some embodiments.

FIG. 5 depicts an example of a flow chart 500 for performing a guest transaction at a financial terminal 130 according to some embodiments. The method of flow chart 500 may be performed, in one embodiment, by a guest or other third party interacting with a financial terminal 130. Flow chart 500 begins with element 502, where the guest may access a financial terminal 130, such as by inserting the customer's EFT card 136 into a card reader 132 or by swiping such card in a card reader 132. The guest may then receive a prompt to enter a PIN number at element 504 and may input the number at element 506. If the entered PIN number is determined to be incorrect at decision block 508, the guest may be asked to reenter the PIN number at element 506. If the PIN number is correct, the method of flow chart 500 may continue to element 510, where the guest may receive a challenge to provide one or more artifacts to authenticate the transaction. The guest may then use the artifact 110 or otherwise provide the artifact 110 at element 512, such as by inserting an artifact 110 into an artifact reader 134 or by allowing the artifact 110 to be swiped, scanned, or otherwise read.

If the financial terminal 130 authorizes the proposed transaction at decision block 514, the guest may request performance of the guest transaction at element 516 and may optionally receive confirmation of approval of such transactions at element 518, after which the method may terminate. In some embodiments, the guest may request the guest transaction by inputting the parameters of the proposed transaction to the financial terminal 130, such as requesting to withdraw cash from an ATM machine or purchase goods or services with a credit card. Alternatively, the guest may input such information at element 502 when they access the financial terminal 130 and before approval for the guest limited transaction is received.

Figure 6:
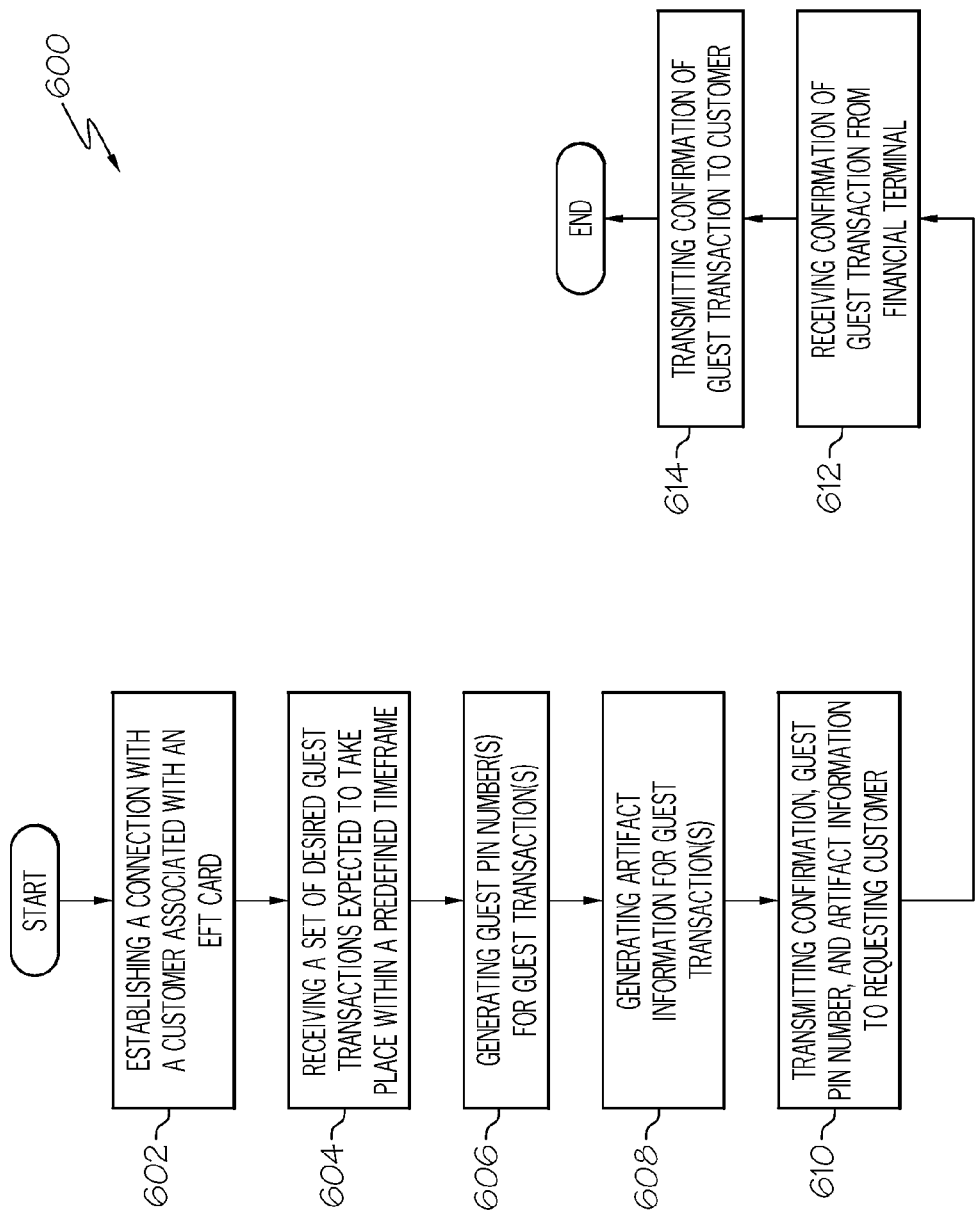
FIG. 6 depicts an example of a flow chart for receiving a desired guest transaction and generating a guest PIN and artifact information according to some embodiments.

FIG. 6 depicts an example of a flow chart 600 for receiving a desired guest transaction and generating a guest PIN and artifact information according to some embodiments. The method of flow chart 600 may be performed, in one embodiment, by components of a financial institution server 106 such as an e-commerce website manager 120 and a guest authorization module 122. Flow chart 600 begins with element 602, where the e-commerce website manager 120 may establish a connection with a customer associated with an EFT card 136. At element 604, the e-commerce website manager 120 may receive a set of one or more desired guest transactions from the customer, including limitations such as a predefined timeframe for completion, and pass the information to the guest authorization module 122.

The guest authorization module 122 may process the customer request by generating a guest PIN number at element 606 and generating artifact information at element 608 for the requested guest transactions. The guest authorization module 122 may optionally analyze the request to determine if it feasible and allowable. The guest authorization module 122 may then at element 610 transmit confirmation, a guest PIN number and artifact information to the requesting customer via the e-commerce website manager 120. In the event that the financial institution server 106 receives confirmation of performance of a guest transaction from a financial terminal 130 at element 612, it may transmit confirmation of the guest transaction performance to the customer at element 614, after which the method may terminate.

Figure 7:
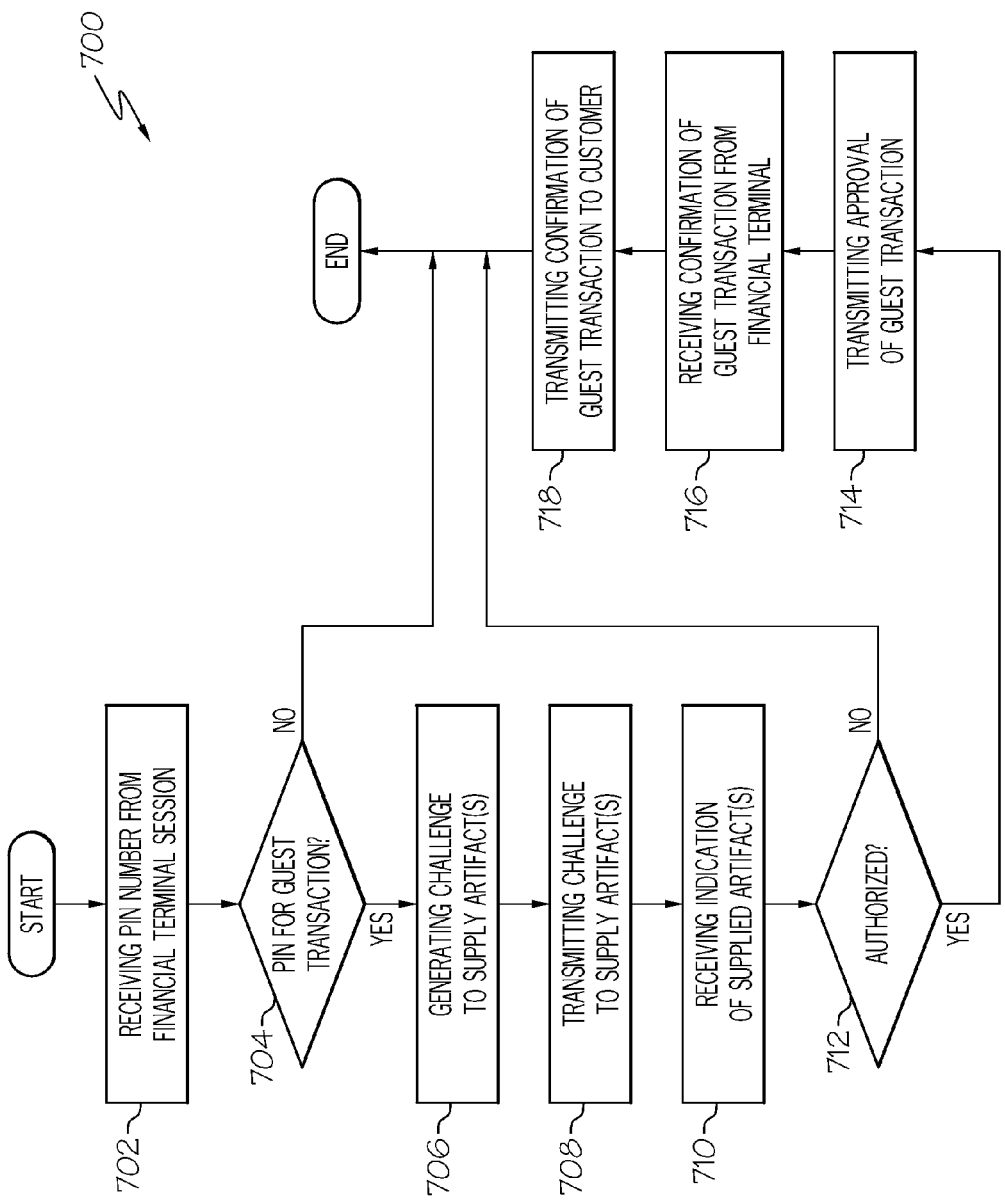
FIG. 7 depicts an example of a flow chart for approving a proposed guest transaction according to some embodiments.

FIG. 7 depicts an example of a flow chart 700 for approving a proposed guest transaction according to some embodiments. The method of flow chart 700 may be performed, in one embodiment, by components of a financial institution server 106 such as a financial terminal manager 124 and a guest authorization module 122. Flow chart 700 begins with element 702, receiving a PIN number from a financial terminal session for a proposed transaction. If the PIN number is not for a guest transaction at decision block 704, the method may terminate and normal processing of financial transactions may commence. If the PIN number is a guest PIN number, the guest authorization module 122 may generate a challenge to the guest to supply an artifact at element 706 and may transmit the challenge to the guest at the financial terminal 130 at element 708 (via the financial terminal manager 124).

At element 710, the guest authorization module 122 (through the financial terminal manager 124) may receive an indication of the artifact 110 supplied by the guest at the financial terminal 130. Alternatively, the challenge to supply an artifact 110 may be performed entirely at the financial terminal 130 so that the guest authorization module 122 need only receive the guest PIN number and artifact indication at element 702. The guest authorization module 122 may determine at decision block 712 whether the proposed transaction is authorized based on the received guest PIN and artifact indication. The guest authorization module 122 may authorize the guest and approve the transaction if the guest PIN and artifact match the ones supplied to the customer (as described in relation to FIG. 6). In some embodiments, the guest authorization module 122 may also determine that the proposed transaction fits within any limitations required by the customer (such as transaction value or nature) before approving the transaction itself. If the guest is authorized, the guest authorization module 122 and the financial terminal manager 124 may transmit approval of the guest transaction at element 714. If confirmation of completion of the transaction is received from the financial terminal 130 at element 716, confirmation of the guest transaction may be transmitted to the customer at element 718, after which the method terminates.

Figure 8:
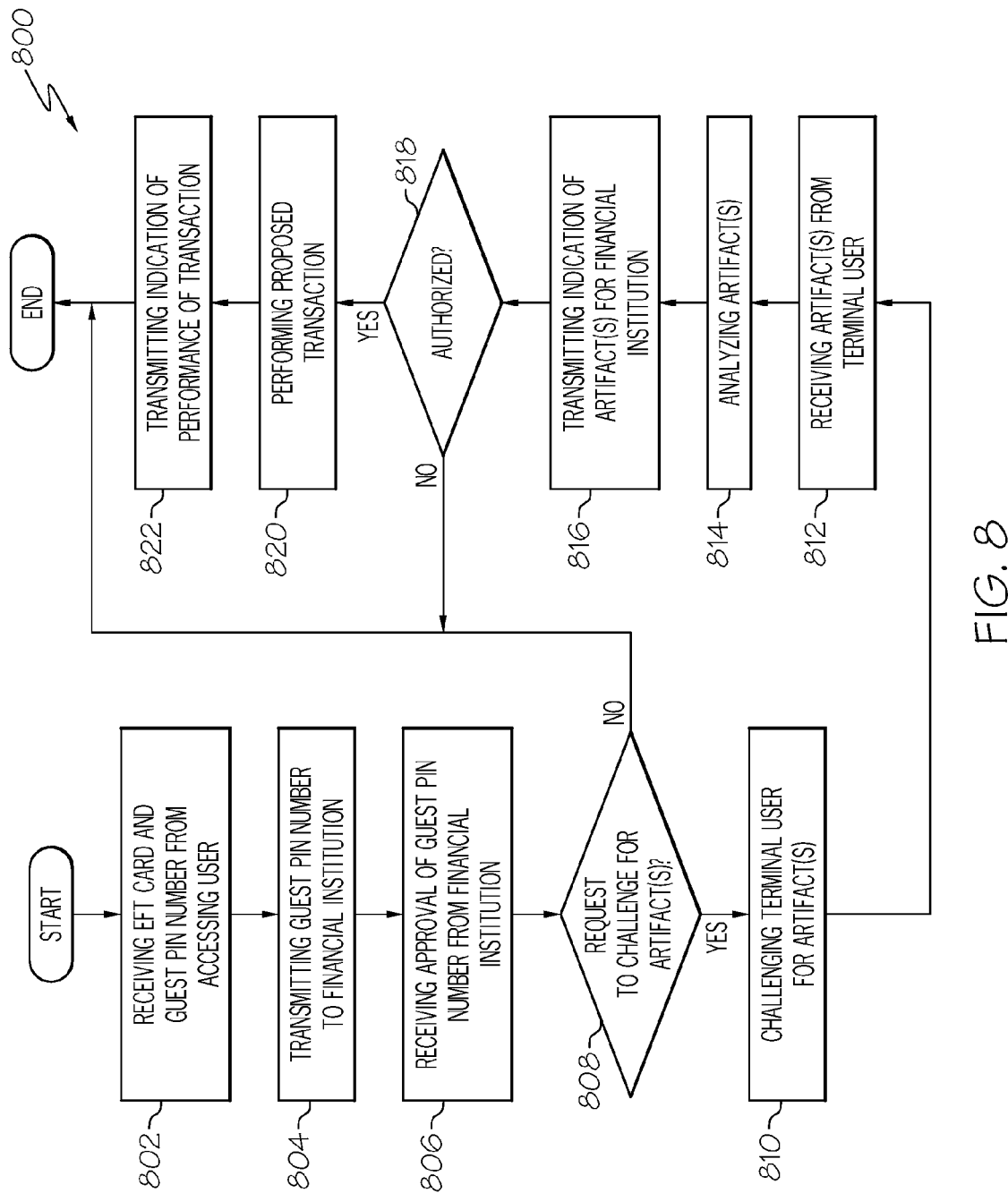
FIG. 8 depicts an example of a flow chart for interacting with a guest performing a guest transaction according to some embodiments.

FIG. 8 depicts an example of a flow chart for interacting with a guest performing a guest transaction according to some embodiments. The method of flow chart 800 may be performed, in one embodiment, by components of a financial terminal 130. Flow chart 800 begins with element 802, receiving an EFT card 136 (via card reader 132) and guest PIN number from an accessing user. The financial terminal 130 may then transmit the guest PIN number and other information (acquired by reading the EFT card 136) to the financial institution at element 804 and may receive approval of the guest PIN number from the financial institution at element 806. The received approval of the guest PIN number may also include a request to challenge the user for an artifact 110 to further authenticate the transaction. This may occur when the financial institution server 106 determines that the PIN number is a guest PIN number. If a request to challenge is received, the financial terminal 130 may challenge the user of the proposed transaction for an artifact 110, such as via a display screen or other user interface device. Alternatively, the financial terminal 130 need not wait for a determination by the financial institution server 106 that a guest PIN was received and the financial terminal 130 may instead make such determination itself.

The financial terminal 130 may receive the artifact 110 from the user at element 812 via the artifact reader 134 or other means. At element 814, the financial terminal 130 may analyze the artifact 110 to extract an indication of the artifact 110. The indication of the artifact 110 may include an identification number or word, a description of any limits of the transaction, or other information. In some embodiments, the financial terminal 130 may analyze the artifact 110 by reading the barcode of a paper artifact 110. The financial terminal 130 may then transmit the indication of the artifact 110 to the financial institution at element 816. If authorizing of the proposed transaction is received at decision block 818, the financial terminal 130 may perform the proposed transaction at element 820. Performance may include charging a credit card, dispensing cash, or other financial transactions. The financial terminal 130 may optionally transmit an indication of performance of the transaction to the financial institution server 106 at element 822, after which the method terminates.

It will be apparent to those skilled in the art having the benefit of this disclosure that the present invention contemplates methods, systems, and media for authorizing a guest to use an EFT card 136. It is understood that the form of the invention shown and described in the detailed description and the drawings are to be taken merely as examples. It is intended that the following claims be interpreted broadly to embrace all the variations of the example embodiments disclosed.

What is claimed is:

1. A computer-implemented method for authorizing a guest to use an electronic financial transaction (EFT) card, the method comprising:
   receiving, by a computer system having one or more processors, information about a desired guest transaction from a customer associated with an EFT card;
   generating a guest personal identification number (PIN) number and artifact information for the guest transaction to be printed on a physical artifact separate from the EFT card associated with the customer, wherein the artifact information comprises one or more limits on the guest transaction;
   providing the guest PIN number to the customer;
   transmitting instructions to print a physical artifact separate from the EFT card, the physical artifact having a printed machine-readable bar code embodying the artifact information;
   receiving from a financial terminal both of a PIN number of an inserted EFT card associated with the customer and artifact information that the financial terminal has read from a printed machine-readable bar code of a supplied physical artifact, both the received PIN number and the artifact information being associated with a proposed transaction utilizing the inserted EFT card;
   comparing the received PIN number to the generated guest PIN number and comparing the artifact information to the proposed transaction;
   in response to comparing both the received PIN number to the generated guest PIN number and the artifact information to the proposed transaction, determining that the proposed transaction is authorized; and
   in response to authorization of the proposed transaction, transmitting approval of the proposed transaction to the financial terminal.

2. The method of claim 1, further comprising establishing a connection with the customer associated with the EFT card.

3. The method of claim 1, further comprising:
   receiving confirmation of performance of the guest transaction from the financial terminal; and
   transmitting confirmation of performance of the guest transaction to the customer.

4. The method of claim 1, wherein the received information about the desired guest transaction comprises a limit to a size of the guest transaction, a predefined timeframe for the guest transaction, or a limit to a subject matter of the guest transaction.

5. The method of claim 1, wherein the desired guest transaction is a reusable guest transaction, and wherein further the received information about the desired guest transaction includes a limit on a number of uses of the guest transaction.

6. The method of claim 1, wherein receiving the PIN number of an inserted EFT card associated with the customer comprises:
   receiving a PIN number from the financial terminal;
   determining whether the PIN number is a guest PIN number;
   in response to determining that the PIN number is a guest PIN number, transmitting a challenge to supply an artifact; and
   receiving the indication of the supplied artifact.

7. The method of claim 1, wherein the EFT card associated with the customer is a credit card, debit card, automated teller machine card, or gift card.

8. A storage device having a computer-readable medium containing instructions effective, when executing in a data processing system, to cause said data processing system to perform operations comprising:
   receiving information about a desired guest transaction from a customer associated with an EFT card;
   generating a guest personal identification number (PIN) number and artifact information for the guest transaction to be printed on a physical artifact separate from the EFT card associated with the customer, wherein the artifact information comprises one or more limits on the guest transaction;
   providing the guest PIN number to the customer;
   transmitting instructions to print a physical artifact separate from the EFT card, the physical artifact having a printed machine-readable bar code embodying the artifact information;
   receiving from a financial terminal both of a PIN number of an inserted EFT card associated with the customer and artifact information that the financial terminal has read from a printed machine-readable bar code of a supplied physical artifact, both the received PIN number and the artifact information being associated with a proposed transaction utilizing the inserted EFT card;
   comparing the received PIN number to the generated guest PIN number and comparing the artifact information to the proposed transaction;
   in response to comparing both the received PIN number to the generated guest PIN number and the artifact information to the proposed transaction, determining that the proposed transaction is authorized; and
   in response to authorization of the proposed transaction, transmitting approval of the proposed transaction to the financial terminal.

9. The computer-readable medium of claim 8, further comprising:
   receiving confirmation of performance of the guest transaction from the financial terminal; and
   transmitting confirmation of performance of the guest transaction to the customer.

10. The computer-readable medium of claim 8, wherein the received information about the desired guest transaction comprises a limit to a size of the guest transaction, a predefined timeframe for the guest transaction, or a limit to a subject matter of the guest transaction.

11. The computer-readable medium of claim 8, wherein the EFT card associated with the customer is a credit card, debit card, or gift card.

* * * * *